(12) United States Patent
Shibuya

(10) Patent No.: US 11,681,485 B2
(45) Date of Patent: Jun. 20, 2023

(54) COUNT DESTINATION MANAGEMENT APPARATUS AND NON-TRANSITORY COMPUTER READABLE MEDIUM

(71) Applicant: FUJIFILM BUSINESS INNOVATION CORP., Tokyo (JP)

(72) Inventor: Naoki Shibuya, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 314 days.

(21) Appl. No.: 16/898,566

(22) Filed: Jun. 11, 2020

(65) Prior Publication Data

US 2021/0141581 A1   May 13, 2021

(30) Foreign Application Priority Data

Nov. 7, 2019   (JP) .............................. JP2019-202490

(51) Int. Cl.
*G06F 3/12* (2006.01)
*G06Q 30/0283* (2023.01)

(52) U.S. Cl.
CPC .......... *G06F 3/1273* (2013.01); *G06F 3/1204* (2013.01); *G06F 3/1257* (2013.01); *G06Q 30/0283* (2013.01)

(58) Field of Classification Search
None
See application file for complete search history.

(56) References Cited

U.S. PATENT DOCUMENTS

| 8,941,855 B2 | 1/2015 | Miyamoto |
| 2014/0362393 A1* | 12/2014 | Kurosawa ................ B41J 29/38 358/1.12 |
| 2015/0339086 A1* | 11/2015 | Hakozaki .............. G06F 3/1273 358/1.15 |
| 2021/0092248 A1* | 3/2021 | Kato .................. H04N 1/00811 |

FOREIGN PATENT DOCUMENTS

| JP | 4481451 B2 | 6/2010 |
| JP | 5932417 B2 | 6/2016 |

* cited by examiner

*Primary Examiner* — Frantz Bataille
(74) *Attorney, Agent, or Firm* — Oliff PLC

(57) ABSTRACT

A count destination management apparatus includes a processor configured to receive image information entered by a user having plural count destinations and specify a count destination corresponding to the image information among the plural count destinations on a basis of identification information included in the image information, the identification information being registered in advance for each of the plural count destinations.

20 Claims, 12 Drawing Sheets

FIG. 5

| No. | WORK | IDENTIFICATION INFORMATION |
|---|---|---|
| 1 | PROJECT 1 | Project 1 |
| | | Pro1 |
| | | P1 |
| | | Proj1 |
| 2 | PROJECT 2 | Project 2 |
| | | Pro2 |
| | | P2 |
| | | Proj2 |
| 3 | PROJECT 3 | Project 3 |
| | | Pro3 |
| | | P3 |
| | | Proj3 |
| 4 | PROJECT 4 | Project 4 |
| | | Pro4 |
| | | P4 |
| | | Proj4 |
| 5 | PROJECT 5 | Project 5 |
| | | Pro5 |
| | | P5 |
| | | Proj5 |

FIG. 6

| No. | WORK | USER ID OF MEMBER OF PROJECT |
|---|---|---|
| 1 | PROJECT 1 | ID001, ID002, ID003, ID004, ID005, ID009, ID013, ID019, ID025 |
| 2 | PROJECT 2 | ID001, ID002, ID006, ID007, ID008, ID009, ID014, ID029 |
| 3 | PROJECT 3 | ID001, ID002, ID007, ID009, ID012, ID020, ID021 |
| 4 | PROJECT 4 | ID001, ID002, ID012, ID018, ID019, ID022, ID023, ID024 |
| 5 | PROJECT 5 | ID001, ID003, ID0017, ID025, ID026, ID027, ID028, ID029 |

FIG. 9

| No. | COUNT DESTINATION | WORK |
|---|---|---|
| 1 | COUNT DESTINATION 1 | PROJECT 1 |
| 2 | COUNT DESTINATION 2 | PROJECT 2 |
| 3 | COUNT DESTINATION 3 | PROJECT 3 |
| 4 | COUNT DESTINATION 4 | PROJECT 4 |
| 5 | COUNT DESTINATION 5 | PROJECT 5 |

FIG. 10

| COUNT ID | USER INFORMATION | COUNT DESTINATION | NUMBER OF SHEETS OF PAPER |
|---|---|---|---|
| 1 | ID001 | COUNT DESTINATION 1 | 5 |
| 2 | ID002 | COUNT DESTINATION 1 | 3 |
| 3 | ID007 | COUNT DESTINATION 2 | 8 |
| 4 | ID009 | COUNT DESTINATION 3 | 1 |
| 5 | ID003 | COUNT DESTINATION 5 | 13 |
| 6 | ID014 | COUNT DESTINATION 2 | 9 |
| 7 | ID002 | COUNT DESTINATION 2 | 3 |
| 8 | ID008 | COUNT DESTINATION 2 | 2 |

FIG. 11

| LOG ID | COUNT ID | USER INFORMATION | COUNT DESTINATION | IDENTIFICATION INFORMATION |
|---|---|---|---|---|
| 1 | 1 | ID001 | COUNT DESTINATION 1 | Project 1 |
| 2 | 2 | ID002 | COUNT DESTINATION 1 | Project 1 |
| 3 | 3 | ID007 | COUNT DESTINATION 2 | Project 2 |
| 4 | 4 | ID009 | COUNT DESTINATION 3 | Proj3 |
| 5 | 5 | ID003 | COUNT DESTINATION 5 | Project 5 |
| 6 | 6 | ID014 | COUNT DESTINATION 2 | Proj2 |
| 7 | 7 | ID002 | COUNT DESTINATION 2 | Proj2 |
| 8 | 8 | ID008 | COUNT DESTINATION 2 | Proj2 |

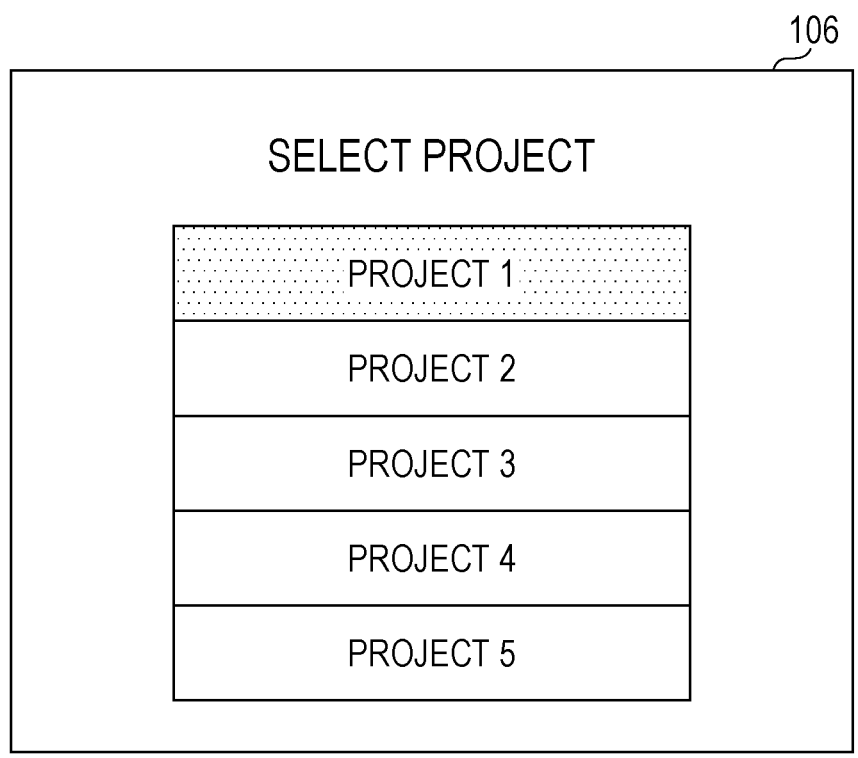

FIG. 15

| LOG ID | COUNT ID | USER INFORMATION | COUNT DESTINATION | IMAGE INFORMATION | IDENTIFICATION INFORMATION |
|---|---|---|---|---|---|
| 1 | 1 | ID001 | COUNT DESTINATION 1 | P.1–P.5 | Project 1 |
| 2 | 2 | ID002 | COUNT DESTINATION 1 | P.1–P.3 | Project 1 |
| 3 | 3 | ID007 | COUNT DESTINATION 2 | P.1–P.8 | Project 2 |
| 4 | 4 | ID009 | COUNT DESTINATION 3 | P.1 | Proj3 |
| 5 | 5 | ID003 | COUNT DESTINATION 1 | P.1–P.7 | Project 1 |
| | | | COUNT DESTINATION 5 | P.8–P.13 | Project 5 |
| 6 | 6 | ID014 | COUNT DESTINATION 2 | P.1–P.9 | Proj2 |
| 7 | 7 | ID002 | COUNT DESTINATION 1 | P.1–P.3 | Project 1 |
| | | | COUNT DESTINATION 2 | P.4–P.14 | Proj2 |
| | | | COUNT DESTINATION 3 | P.15–P.21 | Proj3 |
| 8 | 8 | ID008 | COUNT DESTINATION 2 | P.1–P.2 | Project 2 |

COUNT DESTINATION MANAGEMENT APPARATUS AND NON-TRANSITORY COMPUTER READABLE MEDIUM

CROSS-REFERENCE TO RELATED APPLICATIONS

This application is based on and claims priority under 35 USC 119 from Japanese Patent Application No. 2019-202490 filed Nov. 7, 2019.

BACKGROUND

(i) Technical Field

The present disclosure relates to a count destination management apparatus and a non-transitory computer readable medium.

(ii) Related Art

Japanese Patent No. 4481451 discloses an output result count system including an information processing apparatus and an output device. The output result count system has a setting unit that acquires information on a directory in which data designated by a user of the information processing apparatus is present and sets a project identifier based on the acquired information on the directory when information for causing the output device to output the data designated by the user of the information processing apparatus is transmitted from the information processing apparatus and a recording unit in which the project identifier set by the setting unit and an output result are recorded in association with each other.

Japanese Patent No. 5932417 discloses an image processing apparatus that registers fee information in a fee management apparatus. The image processing apparatus has a requesting unit that requests user authentication from the fee management apparatus, an acquisition unit that acquires case information of a user authenticated by the fee management apparatus, a selection unit that selects one piece of case information from among pieces of case information acquired by the acquisition unit, a job execution unit that executes a job by using a function of the image processing apparatus, and a registration unit that registers, in the fee management apparatus, fee information of the job executed by the job execution unit as fee information of the case information selected by the selection unit.

SUMMARY

In some cases, a user who belongs to plural organizations or companies instructs an image forming apparatus to perform processing such as scan or copy on a document created or used for an organization or a company. In such cases, it is necessary to clarify for which organization or company the document to be subjected to the processing is created or used and record a result of the processing as a count destination for charging a fee for usage of the image forming apparatus. Furthermore, the processing is sometimes performed on plural documents at once.

Aspects of non-limiting embodiments of the present disclosure relate to a count destination management apparatus and a non-transitory computer readable medium that can lessen user's trouble of designating a count destination from among plural count destinations when giving an instruction to read a document as compared with a case where the user himself or herself designates a count destination.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided a count destination management apparatus including a processor configured to receive image information entered by a user having plural count destinations and specify a count destination corresponding to the image information among the plural count destinations on a basis of identification information included in the image information, the identification information being registered in advance for each of the plural count destinations.

BRIEF DESCRIPTION OF THE DRAWINGS

FIG. 5 is an explanatory view illustrating an example of a project management table according to the first exemplary embodiment of the present disclosure;

FIG. 6 is an explanatory view illustrating another example of the project management table according to the first exemplary embodiment of the present disclosure;

FIG. 9 is an explanatory view illustrating an example of a count destination management table according to the first exemplary embodiment of the present disclosure;

FIG. 10 is an explanatory view illustrating an example of a count information database according to the first exemplary embodiment of the present disclosure;

FIG. 11 is an explanatory view illustrating an example of a log database according to the first exemplary embodiment of the present disclosure;

FIG. 14 is an explanatory view illustrating an example of a screen displayed on a display in a case where a count destination cannot be specified according to the first exemplary embodiment of the present disclosure; and FIG. 15 is an explanatory view illustrating an example of a log database according to a third exemplary embodiment of the present disclosure.

DETAILED DESCRIPTION

First Exemplary Embodiment

Figure 1:
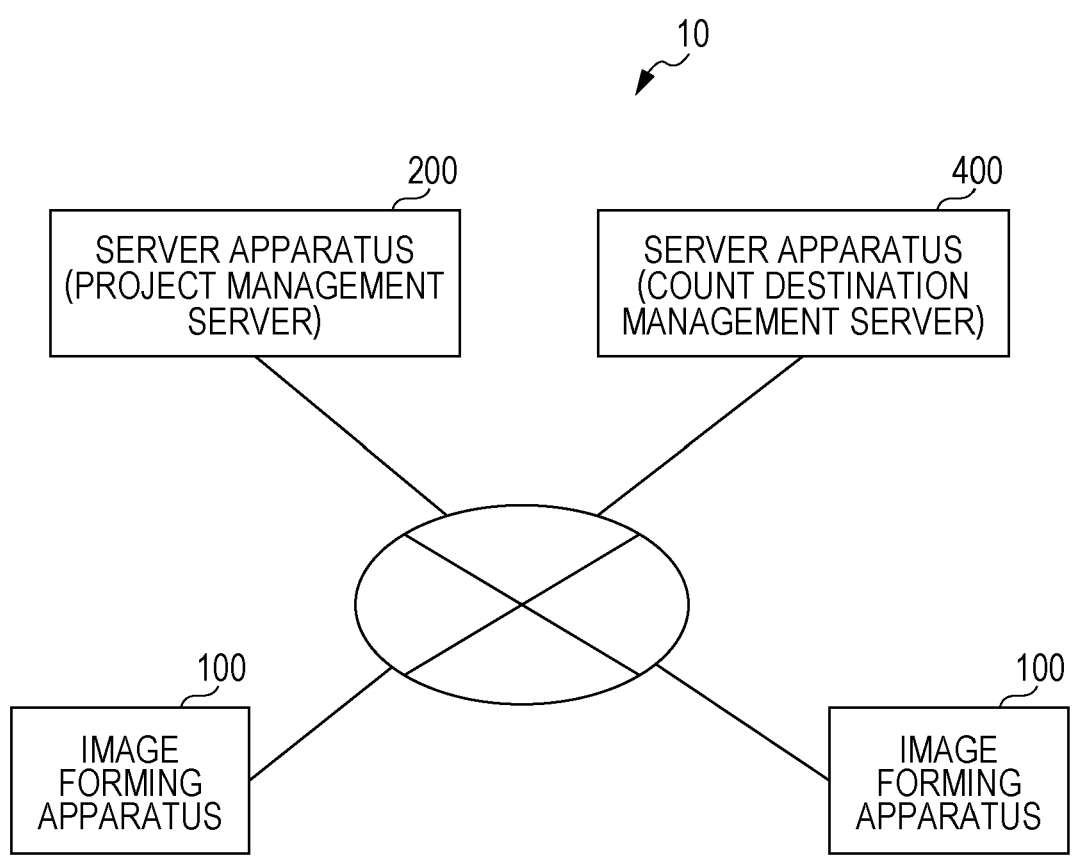
FIG. 1 schematically illustrates an outline configuration of a count destination management system according to a first exemplary embodiment of the present disclosure.

An exemplary embodiment of the present disclosure is described below with reference to the drawings. Identical or equivalent constituent elements and parts in the drawings are given identical reference signs. Furthermore, dimensional ratios in the drawings are exaggerated for convenience of description and may be different from actual ratios.

FIG. 1 illustrates an outline configuration of a count destination management system 10 according to the present exemplary embodiment.

As illustrated in FIG. 1, the count destination management system 10 includes an image forming apparatus 100, which is an example of a count destination management apparatus, a server apparatus (project management server) 200, and a server apparatus (count information database) that are connected over means of communication such as a network. The means of communication may be any of various networks such as the Internet, an intranet, and Ethernet (Registered Trademark) as described later. Although two image forming apparatuses 100, a single server apparatus (project management server) 200, and a single server apparatus (count destination management server) are illustrated in the example of FIG. 1, the number of image forming apparatuses 100, the number of server apparatuses (project management servers) 200, and the number of server apparatuses (count destination management servers) are not limited to these numbers. Furthermore, although a project management server and a count destination management server are separately provided, a single server apparatus may function as both a project management server and a count destination management server. Furthermore, no server apparatus may be provided. In this case, the image forming apparatus 100 functions as one of or both of a project management server and a count destination management server.

The image forming apparatus 100 is provided, for example, at a shared office and is used by a user who belongs to plural companies or organizations.

Figure 2:
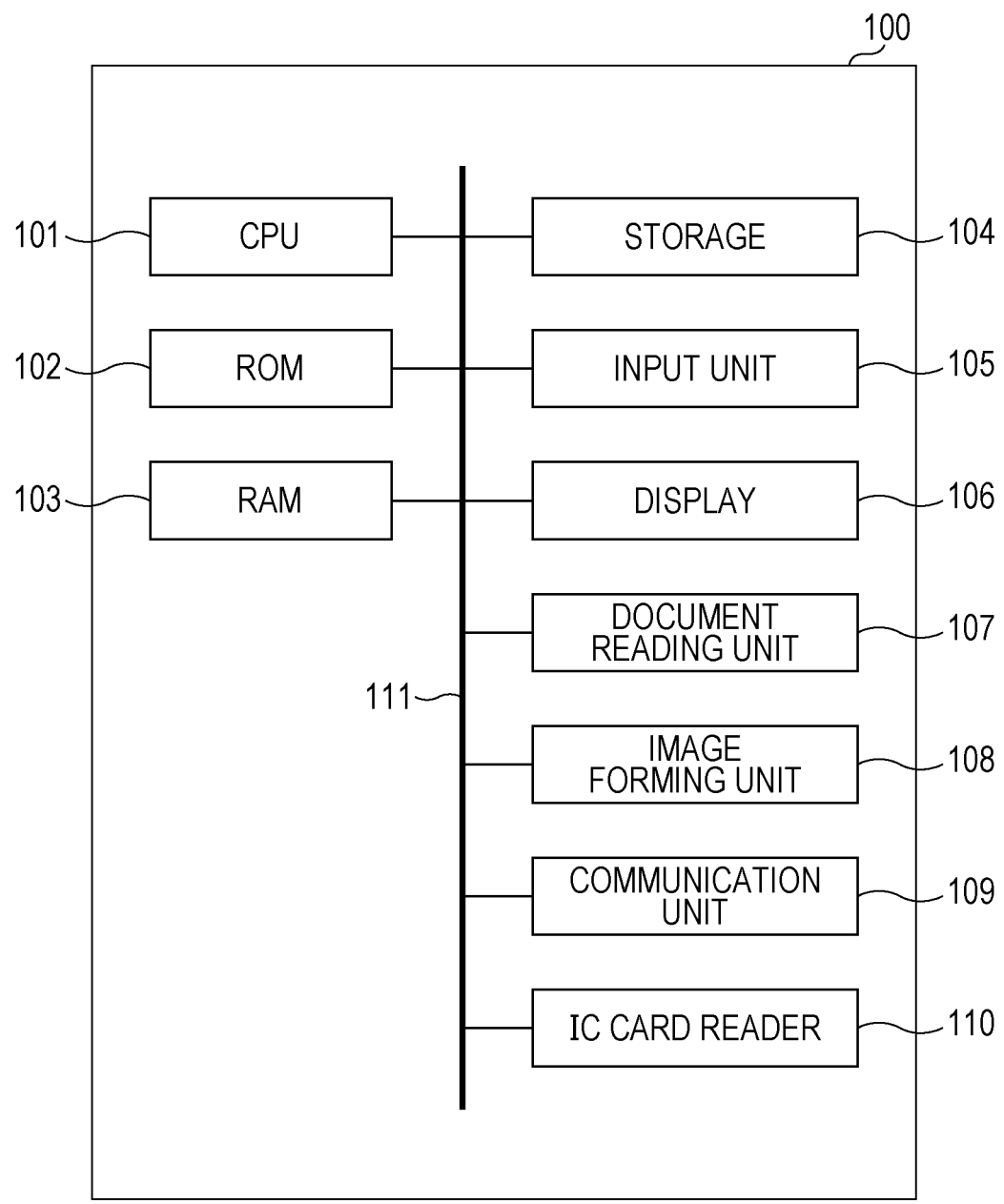
FIG. 2 is a block diagram schematically illustrating an image forming apparatus according to the first exemplary embodiment of the present disclosure.

FIG. 2 is a block diagram illustrating a hardware configuration of the image forming apparatus 100.

As illustrated in FIG. 2, the image forming apparatus 100 has a central processing unit (CPU) 101, which is an example of a processor, a read only memory (ROM) 102, a random access memory (RAM) 103, a storage 104, an input unit 105, a display 106, a document reading unit 107, an image forming unit 108, a communication unit 109, and an IC card reader 110. These constituent elements are communicably connected to one another through a bus 111.

The CPU 101 executes various programs and controls each unit. That is, the CPU 101 reads out a program from the ROM 102 or the storage 104 and executes the program while using the RAM 103 as a work area. The CPU 101 controls the constituent elements and performs various kinds of arithmetic processing in accordance with programs stored in the ROM 102 or the storage 104. In the present exemplary embodiment, programs are stored in the ROM 102 or the storage 104.

The ROM 102 stores therein various kinds of programs and various kinds of data. The RAM 103 serves as a work area that temporarily stores therein a program or data. The storage 104 is a hard disk drive (HDD) or a solid state drive (SSD) and stores therein various kinds of programs including an operating system and various kinds of data.

The input unit 105 is used for various kinds of input, and examples thereof include pointing devices such as a mouse and a keyboard. The input unit 105 is used to register a project, identification information, and a count destination as described later. Furthermore, the input unit 105 is used to give an instruction such as an instruction to start reading a document by using the document reading unit 107 or an instruction to start copying a document.

The display 106 is, for example, a liquid crystal display and displays various kinds of information under control of the CPU 101. In the present exemplary embodiment, the display 106 displays, for example, a specified count destination as described later. Furthermore, the display 106 may be a touch panel display that also functions as the input unit 105.

The document reading unit 107 receives documents one by one that are fed from a paper feed tray of an automatic feeder (not illustrated) provided in an upper portion of the image forming apparatus 100 and optically reads the documents to obtain image information. Alternatively, the document reading unit 107 optically reads a document placed on a platen such as platen glass to obtain image information. That is, a user supplies image information to the image forming apparatus 100 by using the document reading unit 107.

A document read by the document reading unit 107 is paper having at least one of a text and an image printed thereon. Image information of a document read by the document reading unit 107 is stored in the storage 104 of the image forming apparatus 100 or a storage of a server apparatus (not illustrated).

The image forming unit 108 forms, on a recording medium such as paper, an image based on image information obtained by the document reading unit 107 or image information obtained, for example, from a personal computer (PC) (not illustrated) connected over a network.

The communication unit 109 is for communicating with other apparatuses such as the server apparatus (project management server) 200 and the server apparatus (count destination management server) 400 and employs standards such as a public line, the Internet, an intranet, Ethernet (Registered Trademark), FDDI, and Wi-Fi (Registered Trademark).

Furthermore, the communication unit 109 connects the image forming apparatus 100 to a public line and transmits and receives image information obtained by the document reading unit 107 to and from another image forming apparatus having a facsimile function.

The IC card reader 110 reads information (e.g., a user ID) stored in an integrated circuit (IC) card.

For the IC card reader 110 to read information stored in an IC card, an IC card storing user information such as a user ID needs to be distributed to a user of the image forming apparatus 100.

A method for identifying a user is not limited to such a method of reading an IC card by using the IC card reader 110. For example, a user may be identified on the basis of an ID entered by the user by using the input unit 105. In this case, the IC card reader 110 is not used. Alternatively, a list of user information registered in advance in the image forming apparatus 100 may be displayed on the display 106, and a user may select his or her user information from the list displayed on the display 106.

Alternatively, a count destination may be specified without identifying a user. User information is not necessarily needed to specify a count destination. Accordingly, it is unnecessary to identify a user in a case where it is unnecessary to manage statuses of use in association with respective users.

Figure 3:
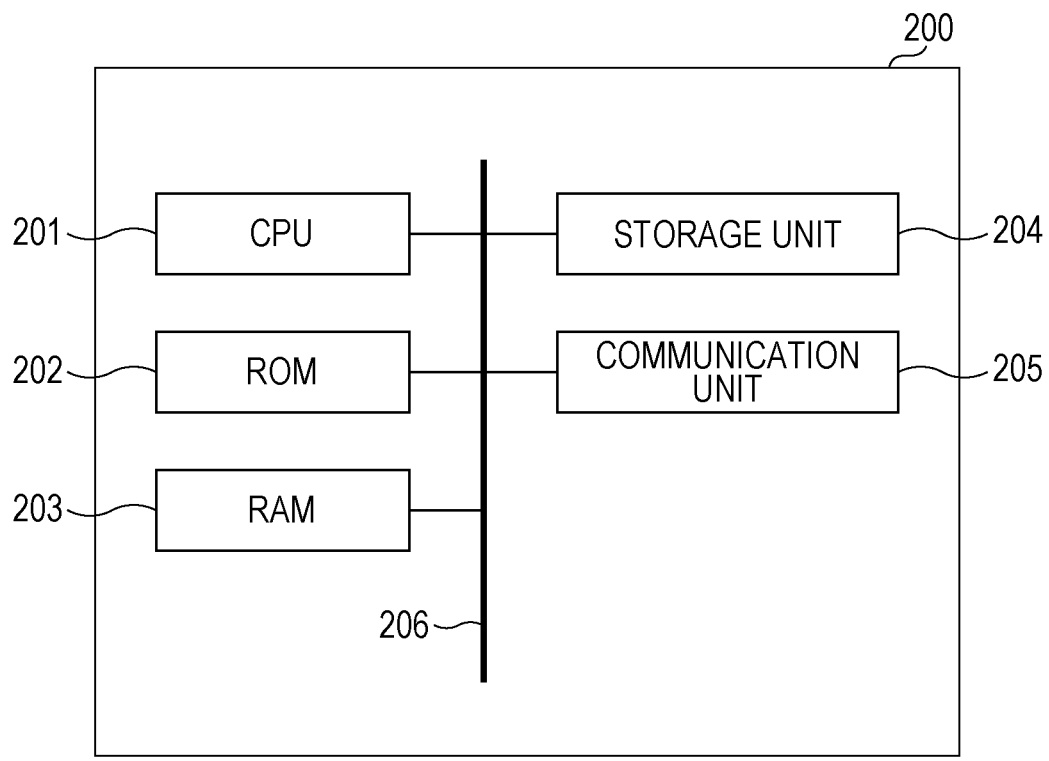
FIG. 3 is a block diagram schematically illustrating a server apparatus (project management server) according to the first exemplary embodiment of the present disclosure.

FIG. 3 is a block diagram illustrating a hardware configuration of the server apparatus (project management server) 200.

As illustrated in FIG. 3, the server apparatus (project management server) 200 has a CPU 201, a ROM 202, a RAM 203, a storage unit (storage) 204, and a communication unit 205. These constituent elements are communicably connected to one another through a bus 206.

The CPU 201 executes various programs and controls each unit. That is, the CPU 201 reads out a program from the ROM 202 or the storage unit (storage) 204 and executes the program while using the RAM 203 as a work area. The CPU 201 controls the constituent elements and performs various kinds of arithmetic processing in accordance with programs stored in the ROM 202 or the storage unit (storage) 204. In the present exemplary embodiment, programs and various kinds of database are stored in the ROM 202 or the storage unit (storage) 204.

The ROM 202 stores therein various kinds of programs and various kinds of data. The RAM 203 serves as a work area that temporarily stores therein a program or data. The storage unit (storage) 204 is an HDD or an SSD and stores therein various kinds of programs including an operating system and various kinds of data.

The communication unit 205 is for communicating with other apparatuses such as the image forming apparatus 100 and the server apparatus (count destination management server) 400 and employs standards such as the Internet, an intranet, Ethernet (Registered Trademark), FDDI, and Wi-Fi (Registered Trademark).

Note that the server apparatus (project management server) 200 may further include an input unit (e.g., pointing devices such as a mouse and a keyboard) used for various kinds of input and a display (e.g., a liquid crystal display) that displays various kinds of information.

Figure 4:
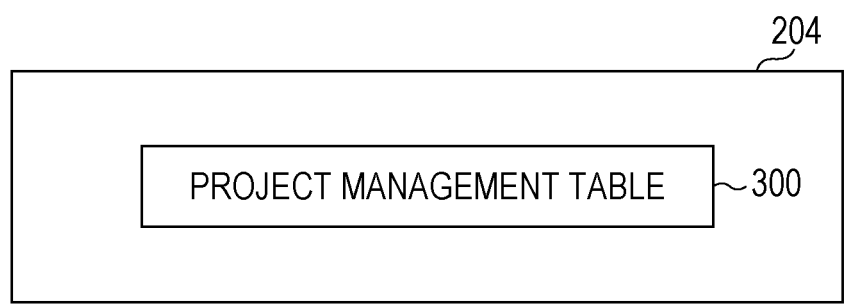
FIG. 4 is a block diagram illustrating an example of a functional configuration of a ROM or a storage of the server apparatus (project management server) according to the first exemplary embodiment of the present disclosure.

As illustrated in FIG. 4, the storage unit (storage) 204 of the server apparatus (project management server) 200 has a storage region that serves as a project management table 300 in which various kinds of data are stored.

As illustrated in FIG. 5, the project management table 300 stores therein projects and identification information of the projects.

The project management table 300 is described below with reference to FIG. 5.

FIG. 5 is an explanatory view illustrating an example of the project management table 300. In FIG. 5, projects 1 to 5 are managed in the project management table 300.

Furthermore, identification information is stored for each of the projects in the project management table 300. For example, "project 1", which is the same character string as the name of the project, and "pro1", "P1", and "Proj1", which are abbreviations, are registered as identification information of the project 1. Note that the identification information is not limited to those illustrated in FIG. 5 and can be any information such as a code number or a nickname.

A user registers a project and identification information in the project management table 300 by using the input unit 105 of the image forming apparatus 100.

A method for registering a project and identification information in the project management table 300 is not limited to this. For example, the project management server may be provided with an input unit, and a user may enter a project and identification information in the project management table 300 by using this input unit.

As illustrated in FIG. 6, the project management table 300 may store therein a project and an ID of a member belonging to the project.

Specifically, in the example illustrated in FIG. 6, members given user IDs of ID001, ID002, ID003, ID004, ID005, ID009, ID013, ID019, and ID025 belong to the project 1, and members given user IDs of ID001, ID002, ID006, ID007, ID008, ID009, ID014, and ID029 belong to the project 2.

A user registers members belonging to the projects in the project management table 300 by using the input unit 105 of the image forming apparatus 100. However, a method for registering members belonging to the projects in the project management table 300 is not limited to this. For example, the project management server may be provided with an input unit, and a user may enter members belonging to the projects in the project management table 300 by using this input unit.

With this configuration, the projects can be narrowed down by reading an IC card by using the IC card reader 110. This can improve accuracy in specifying a count destination. Furthermore, counting can be performed for each user.

Figure 7:
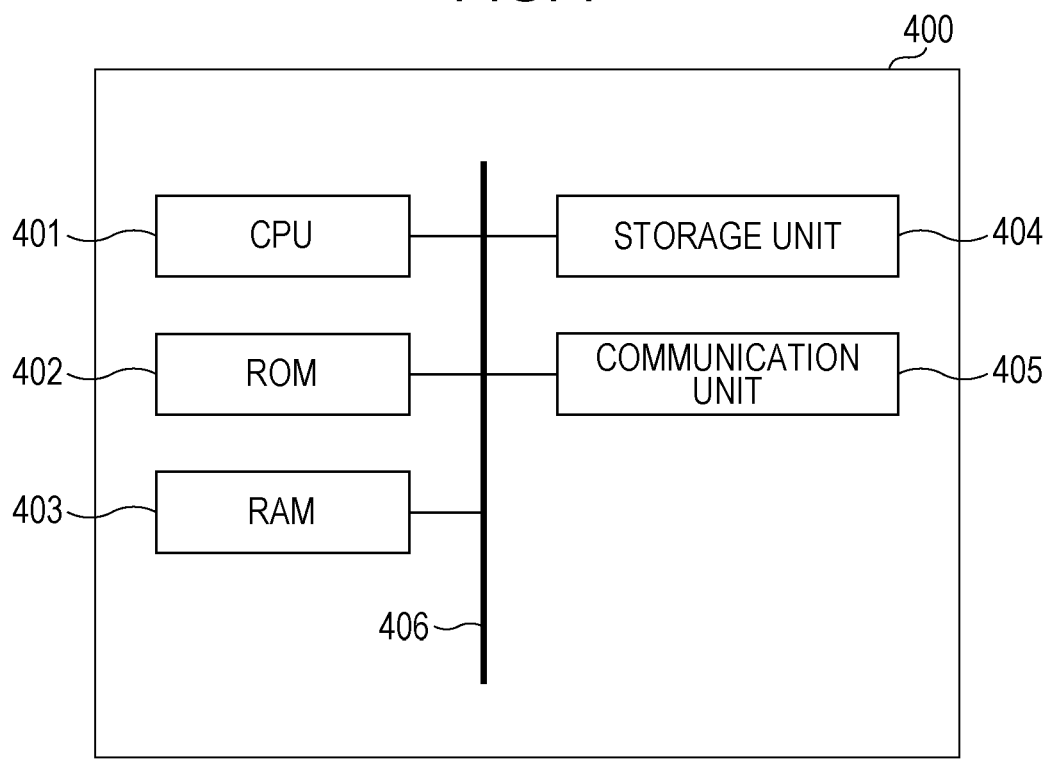
FIG. 7 is a block diagram illustrating an example of a functional configuration of a ROM or a storage of a server apparatus (count destination management server) according to the first exemplary embodiment of the present disclosure.

FIG. 7 is a block diagram illustrating a hardware configuration of the server apparatus (count destination management server) 400.

As illustrated in FIG. 7, the server apparatus (count destination management server) 400 has a CPU 401, a ROM 402, a RAM 403, a storage unit (storage) 404, and a communication unit 405. These constituent elements are communicably connected to one another through a bus 406.

The CPU 401 executes various programs and controls each unit. That is, the CPU 401 reads out a program from the ROM 402 or the storage unit (storage) 404 and executes the program while using the RAM 403 as a work area. The CPU 401 controls the constituent elements and performs various kinds of arithmetic processing in accordance with programs stored in the ROM 402 or the storage unit (storage) 404. In the present exemplary embodiment, programs and various kinds of database are stored in the ROM 402 or the storage unit (storage) 404.

The ROM 402 stores therein various kinds of programs and various kinds of data. The RAM 403 serves as a work area that temporarily stores therein a program or data. The storage unit (storage) 404 is an HDD or an SSD and stores therein various kinds of programs including an operating system and various kinds of data.

The communication unit 405 is for communicating with other apparatuses such as the image forming apparatus 100 and the server apparatus (project management server) 200 and employs standards such as the Internet, an intranet, Ethernet (Registered Trademark), FDDI, and Wi-Fi (Registered Trademark).

Note that the server apparatus (count destination management server) 400 may include an input unit (e.g., pointing devices such as a mouse and a keyboard) used for various kinds of input and a display (e.g., a liquid crystal display) that displays various kinds of information.

Figure 8:
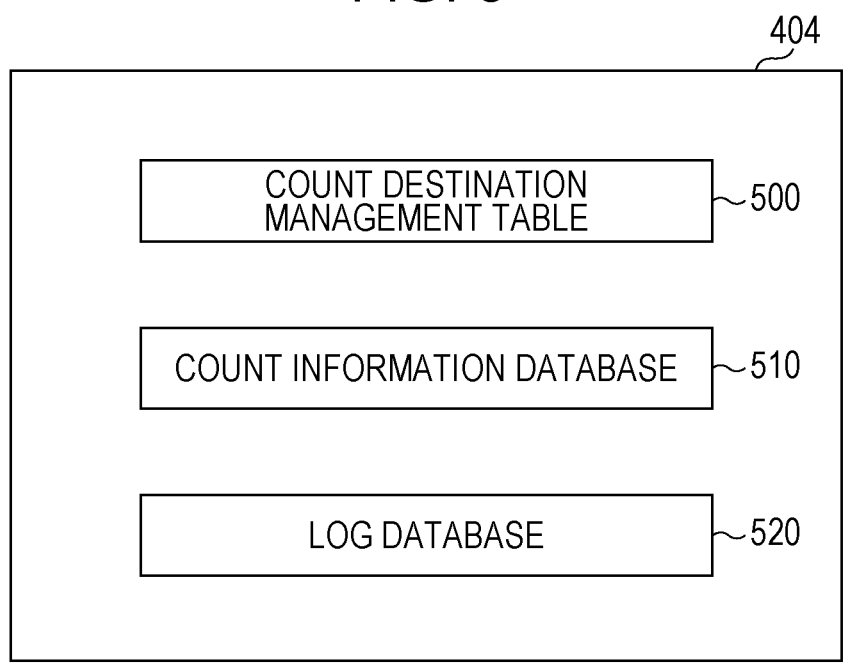
FIG. 8 is a block diagram illustrating an example of a functional configuration of a ROM or a storage of the server apparatus (project management server) according to the first exemplary embodiment of the present disclosure.

As illustrated in FIG. 8, the storage unit (storage) 404 of the server apparatus (count destination management server) 400 has storage regions that serve as a count destination management table 500, a count information database 510, a log database 520 in which various kinds of data are stored.

The count information database 510 and the log database 520 need not be stored in the server apparatus (count destination management server) 400 and may be stored in the image forming apparatus 100, the server apparatus (project management server) 200, or another server apparatus.

As illustrated in FIG. 9, the count destination management table 500 stores a count destination and a project as a count result.

The count destination management table 500 is described below with reference to FIG. 9.

FIG. 9 is an explanatory view illustrating an example of the count destination management table 500. In the count destination management table 500, a correspondence between a count destination and a project is stored. For example, the project 1 corresponds to a count destination 1, and the project 2 corresponds to a count destination 2.

Accordingly, in a case where a document of the project 1 is read by the document reading unit 107, the count destination 1 corresponding to the project 1 is specified as a count destination, and, for example, the number of sheets of paper included in the document read by the document reading unit 107 is stored in the server apparatus (count destination management server) 400. This will be described later.

The project management table 300 and the count destination management table 500 need not be separately stored unlike the above case and may be stored as the same table. That is, both of the project management table 300 and the count destination management table 500 may be stored as the same table in any one of the server apparatus (project management server) 200 and the server apparatus (count destination management server) 400.

The count information database 510 stores therein a result of processing for specifying a count destination performed by the count destination specifying unit 130 (see FIG. 12), which will be described later.

The count information database 510 is described below with reference to FIG. 10.

FIG. 10 is an explanatory view illustrating an example of the count information database 510. The count information database 510 stores therein a correspondence between a count destination specified by the count destination specifying unit 130, which will be described later, and the number of sheets of paper included in a document.

For example, in a count ID "1", information indicating that 5 sheets of paper included in a document concerning the project 1 corresponding to the count destination 1 were read under an instruction from a user given user information "ID001" is stored. Similarly, in a count ID "5", information indicating that 13 sheets of paper included in a document concerning a project 5 corresponding to a count destination 5 were read under an instruction from a user given a user ID "ID003" is stored.

A usage fee for each project is calculated on the basis of the number of sheets of paper counted in the count information database 510. For example, in a case where cost per sheet of paper is set (e.g., 10 yen), a usage fee is calculated on the basis of the number of sheets of paper counted by the count information database 510 and the cost per sheet of paper. A fee for each project is charged on the basis of the usage fee thus calculated.

Note that information counted in the count information database 510 is not limited to the number of sheets of paper and may be, for example, color information indicating whether a document is printed in black and white or printed in color, information on a document size, or information indicating whether a document is two-sided printed or one-sided printed.

Figure 12:
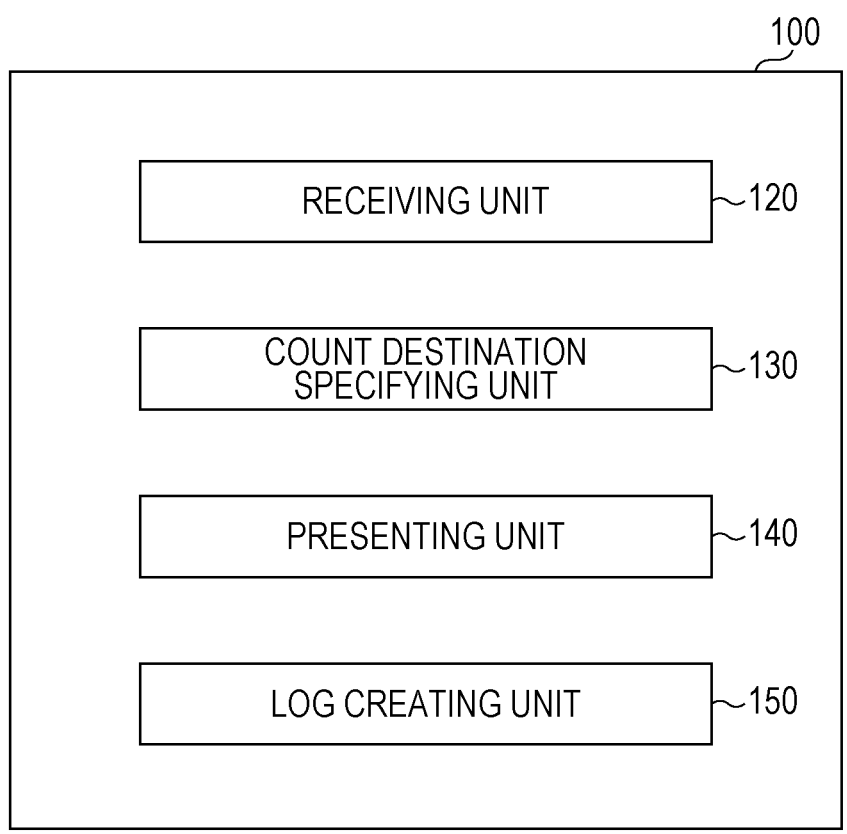
FIG. 12 is a block diagram illustrating an example of a functional configuration of an image forming apparatus according to the first exemplary embodiment of the present disclosure.

The log database 520 stores therein a log of the processing for specifying a count destination created by a log creating unit 150 (see FIG. 12).

The log database 520 is described below with reference to FIG. 11.

FIG. 11 is an explanatory view illustrating an example of the log database 520. The log database 520 stores therein a log of the processing for specifying a count destination created by the log creating unit 150, which will be described later. In the log, a correspondence between information indicative of a document for which a count destination has been specified and the specified count destination is stored.

The information indicative of a document for which a count destination has been specified is, for example, a count ID (see FIG. 10). Note that the information indicative of a document for which a count destination has been specified is not limited to a count ID and may be, for example, a time at which the document was read by the document reading unit 107 or a file name given to image information obtained by reading the document by the document reading unit 107.

In the log database 520, for example, information indicating that the count destination 1 has been specified as a count destination of a document indicated by the count ID "1" is stored in a log ID "1". Furthermore, information indicating that the count destination 1 has been specified because the document read by the document reading unit 107 under an instruction from the user given user information "ID001" includes a character string "project 1", which is identification information, is also stored.

Similarly, information indicating that the count destination 2 has been specified as a count destination for a document indicated by a count ID "6" is stored in a log ID "6". Furthermore, information indicating that the count destination 2 has been specified because the document read by the document reading unit 107 under an instruction from a user given user information "ID014" includes a character string "Proj2", which is identification information, is also stored.

Information stored in the log database 520 is not limited to the one illustrated in FIG. 11. One or more of the pieces of information illustrated in FIG. 11 may be missing. Furthermore, information such as a time at which a count destination was specified and the number of read sheets of paper for which a count destination has been specified may be additionally stored in the log database 520.

A person in charge of accounting of a project calls up the count result stored in the count information database 510 and the log stored in the log database 520 on his or her PC connected to the server apparatus (count destination management server) 400 over a network and counts a usage fee for the project by matching the count result and the log against each other, for example, every cutoff day (not illustrated).

The image forming apparatus 100 realizes various kinds of functions by using the hardware resources. A functional configuration realized by the image forming apparatus 100 is described below.

FIG. 12 is a block diagram illustrating an example of a functional configuration of the image forming apparatus 100.

As illustrated in FIG. 12, the image forming apparatus 100 has, as functional elements, a receiving unit 120, a count destination specifying unit 130, a presenting unit 140, and the log creating unit 150. The CPU 101 reads out programs from the ROM 102 or the storage unit (storage) 104 and executes the programs thus read out to realize these functional elements.

The receiving unit 120 receives image information input by a user. Specifically, the receiving unit 120 receives image information obtained by reading a document by using the document reading unit 107 of the image forming apparatus 100 under an instruction from a user who belongs to plural projects and therefore has plural count destinations.

The count destination specifying unit 130 specifies a count destination corresponding to image information obtained by reading a document by using the document reading unit 107 of the image forming apparatus 100 among the plural count destinations in a case where the image information includes identification information, which is decided in advance for each of the count destinations.

Specifically, the count destination specifying unit 130 performs optical character recognition (OCR) processing on the obtained image information and determines whether or not a character string obtained by the OCR processing includes a character string that matches identification information (see FIGS. 5 and 9). A count destination corresponding to the character string that matches identification information is specified as a count destination corresponding to the image information. The specified count destination is stored in the count information database 510.

In a case where the count destination specifying unit 130 determines that the character string obtained by the OCR processing includes no character string that matches identification information, a list of projects stored in the project management table is displayed on the display 106 of the image forming apparatus 100 to prompt the user to select a project, and the project selected by the user is specified as a count destination.

A method for determining whether or not image information includes a character string that matches identification information is not limited to the above method for performing OCR processing on image information and determines whether or not a character string obtained by the OCR processing includes a character string that matches identification information, which is decided in advance for each count destination. For example, the count destination specifying unit 130 may determine whether or not the image information includes a character string that matches identification information by using pattern matching or template matching.

The presenting unit 140 causes the count destination specified by the count destination specifying unit 130 to be displayed for the user on the display 106.

The log creating unit 150 creates a log every time the count destination specifying unit 130 specifies a count destination. The log created by the log creating unit 150 is stored in the log database 520 as described above.

Among the functional elements, especially the count destination specifying unit 130 and the log creating unit 150 need not be provided in the image forming apparatus 100 and may be provided in the server apparatus (project management server) 200 or the server apparatus (count destination management server) 400.

Next, operation of the count destination management system 10 is described.

Figure 13:
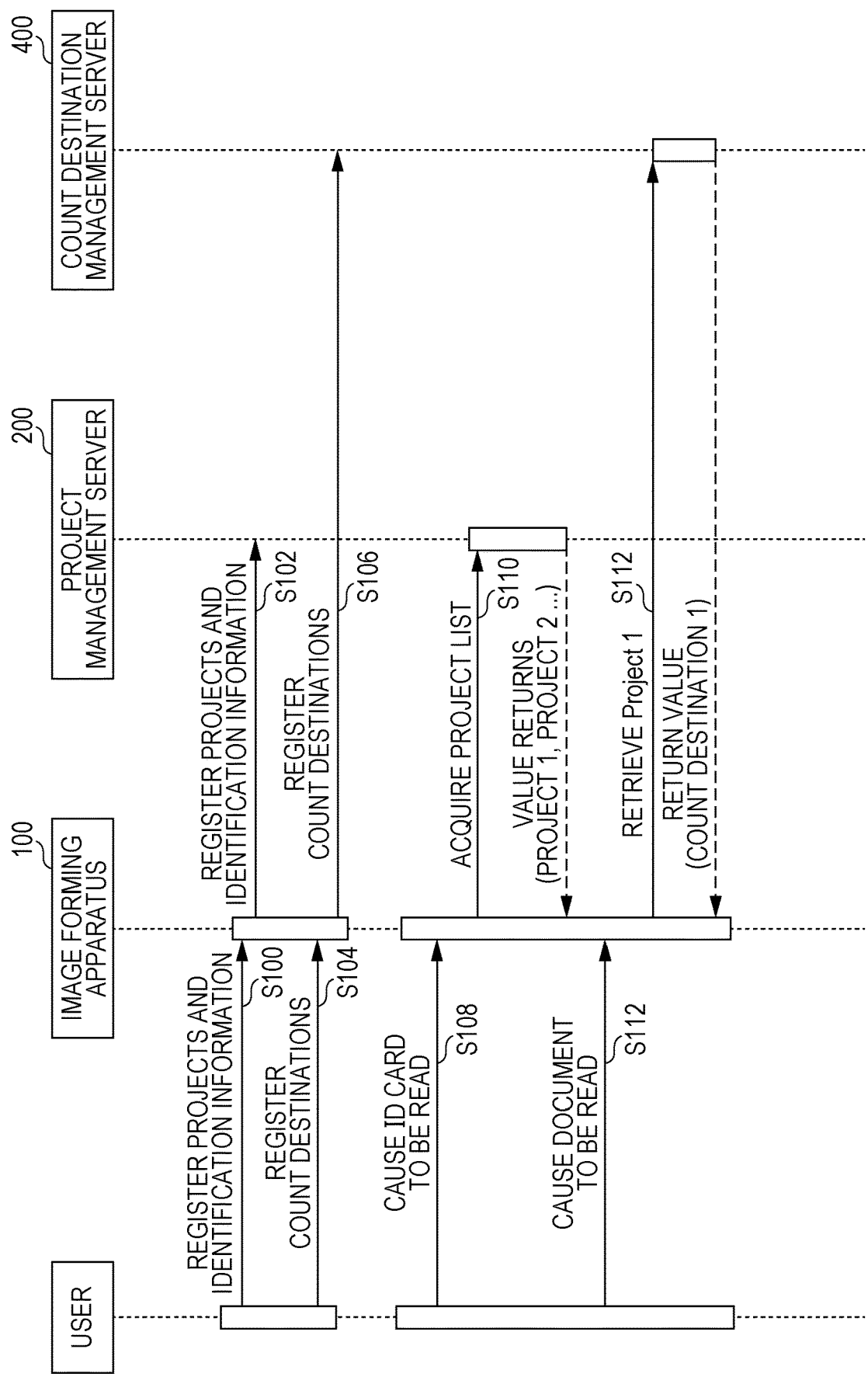
FIG. 13 is a sequence diagram illustrating an example of operation of a count destination management system according to the first exemplary embodiment of the present disclosure.

FIG. 13 is a sequence diagram illustrating an example of operation of the count destination management system 10.

In step S100, a user registers projects and identification information of the projects by using the input unit 105 of the image forming apparatus 100. In step S102, the CPU 101 of the image forming apparatus 100 that receives the entry of the projects registers correspondences between the projects and the identification information in the project management table 300 of the project management server (see FIG. 5).

In step S104, the user who belongs to plural projects and therefore has plural count destinations registers count destinations for the respective projects by using the input unit 105 of the image forming apparatus 100. In step S106, the CPU 101 of the image forming apparatus 100 that has received the entry of the count destinations registers the count destinations in the count destination management table 500 of the count destination management server (see FIG. 9).

Steps S100 to S106 are preparation for management of count destinations. Furthermore, the projects, the identification information of the projects, and the count destinations of the respective projects are associated based on both of the project management table 300 and the count destination management table 500.

In step S108, the user causes an ID card to be read by using the IC card reader 110 of the image forming apparatus 100. In step S110, the CPU 101 of the image forming apparatus 100 that has received information stored in the IC card transmits a signal for acquiring a project list to the project management server.

That is, a list of projects is created on the basis of the project management table 300 by the project management server, and the list is transmitted from the project management server to the image forming apparatus 100.

A method for creating a list of projects is not limited to such a method for creating a list of projects based on the project management table 300. In a case where IDs of members belonging to projects are registered, a list of projects to which a user ID of user information registered in an IC card read by the IC card reader 110 belongs may be created. According to this configuration, it is possible to reduce the number of pieces of identification information of projects to be subjected to retrieval (described later), and it is therefore possible to improve accuracy of retrieval for specifying a count destination.

The list of projects is temporarily stored in the image forming apparatus 100.

In step S112, the user causes the document reading unit 107 (scanner unit) of the image forming apparatus 100 to read a document. The CPU 101 (receiving unit 120) of the image forming apparatus 100 that has read the document receives image information obtained by reading the document. The CPU 101 (count destination specifying unit 130) of the image forming apparatus 100 performs OCR processing on the received image information. It is determined whether or not a character string obtained by the OCR processing includes a character string that matches identification information included in the project list that is temporarily stored in the image forming apparatus 100.

In a case where it is determined that the character string obtained by the OCR processing includes a character string that matches identification information included in the project list that is temporarily stored in the image forming apparatus 100, a project name corresponding to this identification information is retrieved from the count destination management table 500 of the count destination management server, and a count destination is specified based on the project name. For example, in a case where a character string "project 1" is obtained as a result of the OCR processing, this character string matches identification information "project 1" of the project 1 (see FIG. 5), and therefore the name of the project 1 corresponding to the identification information is retrieved from the count destination management table 500, and the count destination (see FIG. 9) corresponding to the project 1 is specified as a count destination. Then, at least the number of sheets of paper is stored in association with the project corresponding to the specified count destination in the count destination management server.

Then, the CPU 401 of the server apparatus (count destination management server) 400 transmits the specified count destination to the image forming apparatus 100, and the CPU 101 (presenting unit 140) of the image forming apparatus 100 causes the received information indicative of the count destination to be displayed on the display 106. For example, in a case where the count destination 1 is specified, information indicating that the count destination 1 has been specified is displayed for the user on the display 106 together with a log ID.

In a case where it is determined that the character string obtained by the OCR processing does not include a character string that matches identification information, the project list and a message prompting the user to select a project are displayed on the display 106 of the image forming apparatus 100 as illustrated in FIG. 14. In this case, a top of the list is being selected. In a case where the user selects a project, a count destination corresponding to this project is specified as a count destination.

In a case where it is determined that the character string obtained by the OCR processing does not include a character string that matches identification information, only a list of projects to which a user ID of user information registered in the ID card read by the IC card reader 110 may be displayed as a project list. This reduces the number of choices, thereby making it easy for the user to select a project.

Data of the document read by the document reading unit 107 is not stored as a file until the user selects a project. In a case where a predetermined period elapses without selection of a project, the data of the document is deleted and information indicating that document reading processing has not been completed is displayed.

In a case where the specified count destination is wrong, the wrong count destination cannot be corrected from the image forming apparatus 100, and the user requests, from persons in charge of accounting of the wrong project and the correct project, to correct the wrong project by using the log ID displayed on the display.

Although an aspect in which a program of the count destination specifying processing is stored (installed) in advance in the ROM 102 or the storage unit (storage) 104 has been described in the above exemplary embodiment, this aspect is not restrictive. The program may be offered by being recorded in a recording medium such as a compact disk read only memory (CD-ROM), a digital versatile disk read only memory (DVD-ROM), or a universal serial bus (USB). The program may be downloaded from an external device over a network.

Second Exemplary Embodiment

Next, a second exemplary embodiment is described below.

In the first exemplary embodiment, a count destination is specified by performing OCR processing on image information obtained by the document reading unit 107 of the image forming apparatus 100 and determining whether or not a character string obtained by the OCR processing includes a character string that matches identification information, which is decided in advance for each count destination. In the second exemplary embodiment, a document format is associated with each count destination, and a count destination is specified by using not a character string but format information on a document format as identification information, which is decided in advance for each count destination.

The following basically describes differences from the first exemplary embodiment, and repeated description is simplified or omitted.

In the present exemplary embodiment, format information on a document format is registered as identification information in addition to or instead of a character string in a project management table 300.

The format information is drawing information that defines positions, sizes, colors, and the like of characters and an image written on a document and includes front-cover format information on a format of a front cover of the document and template information on a template of the document.

Note that the format information is not limited to the front-cover format information and the template information and may be, for example, information on a format of a header, footer, or the like.

The front-cover format information is information on a format used for a front cover of a document. In a case where a format of a front cover is decided for each project, a count destination specifying unit 130 specifies a count destination for a document on the basis of a format of a front cover.

Specifically, the count destination specifying unit 130 determines whether or not each page of a document included in image information read by a document reading unit 107 includes front-cover format information registered in the project management table 300. In a case where front-cover format information is included, a count destination corresponding to the front-cover format information is specified as a count destination corresponding to the image information.

The template information is information on a format used as a template of a document. In a case where a template such as a layout or a fixed phrase is set for each project, the count destination specifying unit 130 specifies a count destination for a document on the basis of a template of the document.

Specifically, the count destination specifying unit 130 determines whether or not each page of a document included in image information read by the document reading unit 107 matches template information registered in the project management table 300. In a case where template information is included, a count destination corresponding to the template is specified as a count destination corresponding to the image information.

A known method such as pattern matching or template matching is used as a method for determining whether or not image information read by the document reading unit 107 matches front-cover format information or template information registered in the project management table 300.

In a case where image information read by the document reading unit 107 does not match front-cover format information registered in the project management table 300, a count destination is specified by performing OCR processing on the image information and determining whether or not a character string obtained by the OCR processing includes a character string that matches identification information, which is decided in advance for each count destination, as in the first exemplary embodiment.

Third Exemplary Embodiment

Next, a third exemplary embodiment is described with reference to FIG. 15.

In the first exemplary embodiment and the second exemplary embodiment, a case where a character string or the like matches identification information corresponding to a single count destination has been described. In the third exemplary embodiment, a case where a character string or the like matches pieces of identification information corresponding to plural count destinations.

The following basically describes differences from the first and second exemplary embodiments, and repeated description is simplified or omitted.

Such a case where a character string or the like matches pieces of identification information corresponding to plural count destinations is, for example, a case where a document concerning a single project includes, as relevant information, a name or the like of another project or a case where a user places documents concerning plural projects on a paper feed tray of an image forming apparatus 100 at once and causes a document reading unit 107 to read the documents.

In a case where image information matches pieces of identification information (mainly character strings) corresponding to plural count destinations, a count destination specifying unit 130 specifies a count destination based on a character string included in an earlier page (e.g., page 1) of the image information among the character strings.

In a case where the matching character strings appear in the same page, a count destination is specified based on a character string included in an earlier part (an upper part) of the page among the character strings.

This aspect corresponds to the case where a document concerning a single project includes, as relevant information, a name or the like of another project.

The count destination specifying unit 130 determines whether or not image information obtained by the document reading unit 107 includes format information. In a case where format information is included, the count destination specifying unit 130 distinguishes different documents per unit of use (e.g., per page) of the format information among plural documents and specifies a corresponding count destination for each of the distinguished documents.

As described above, the format information includes front-cover format information on a format of a front cover of a document and template information on a template of a document.

In the case of the front-cover format information, the count destination specifying unit 130 determines whether or not each page of plural documents included in image information obtained by the document reading unit 107 includes front-cover format information, divides the image information on the basis of pages including front-cover format information, and specifies a count destination for each of documents thus divided.

For example, in a case where image information of 13 pages is obtained, the count destination specifying unit 130 determines whether or not each page matches front-cover format information. In a case where a page 1 matches front-cover format information corresponding to a count destination 1 and a page 8 matches front-cover format information corresponding to a count destination 5, the count destination specifying unit 130 divides the image information into (i) pages 1 to 7 and (ii) pages 8 to 13, and specifies the count destination 1 as a count destination for the pages 1 to 7 and specifies the count destination 5 as a count destination for the pages 8 to 13.

This aspect corresponds to the case where a user places documents concerning plural projects on a paper feed tray of the image forming apparatus 100 at once and causes the document reading unit 107 to read the documents.

In this case, a log creating unit 150 causes correspondences between pages of plural documents included in image information and count destinations specified for the pages to be recorded in a log database 520 as illustrated in FIG. 15.

For example, as illustrated in FIG. 15, information indicating that image information includes 13 pages, and the count destination 1 has been specified as a count destination for pages 1 to 7, and the count destination 5 has been specified as a count destination for pages 8 to 13 is recorded in a log ID "5". This case is a case where a user "ID003" places a document concerning a project 1 made up of 7 pages and a document concerning a project 5 made up of 6 pages on a paper feed tray at once and causes the document reading unit 107 to read the documents.

In the case of the template information, the count destination specifying unit 130 determines whether or not each page of plural documents included in image information obtained by the document reading unit 107 includes template information, distinguishes documents per page including the template information and specifies a count destination for each of the distinguished documents.

For example, in a case where image information of 13 pages is obtained, the count destination specifying unit 130 determines whether or not each page matches template information. In a case where pages 1 to 7 match template information corresponding to the count destination 1 and pages 8 to 13 match template information corresponding to the count destination 5, the count destination specifying unit 130 specifies the count destination 1 as a count destination for the pages 1 to 7 and specifies the count destination 5 as a count destination for the pages 8 to 13.

This aspect corresponds to the case where a user places documents concerning plural projects on a paper feed tray of the image forming apparatus 100 at once and causes the document reading unit 107 to read the documents.

As in the case of the front-cover format information, the log creating unit 150 causes correspondences between pages of plural documents included in image information and count destinations specified for the pages to be recorded in the log database 520 as illustrated in FIG. 15.

In a case where image information includes both of front-cover format information and template information, the front-cover format information is given priority. In this case, the count destination specifying unit 130 divides the image information based on pages that match front-cover format information and specifies a count destination for each of documents thus divided.

Note that template information, which is restricted in a case where front-cover format information is given priority over template information to specify a count destination, may be given priority. In this case, the count destination specifying unit 130 may distinguish documents per page that matches template information and specify a count destination for each of the distinguished documents.

Modifications

The present disclosure is not limited to the above exemplary embodiments and can be modified and applied in various ways without departing from the spirit of the present disclosure.

Although a case where image information is obtained by the document reading unit 107 of the image forming apparatus 100 and is stored in a storage (i.e., a scanner function)

has been described in the above exemplary embodiments, this is not restrictive. For example, the present disclosure may be applied to a case where image information is obtained by the document reading unit 107 of the image forming apparatus 100 and printed on paper by using the image forming unit 108 (i.e., a copy function).

Furthermore, the present disclosure may be applied to a case where image information is supplied not from the document reading unit 107 of the image forming apparatus 100 but from a PC connected to the count destination management system 10 over a network (i.e., a printing function). In this case, the count destination specifying unit 130 analyses the image information supplied from the PC to the image forming apparatus 100 and determines whether or not the image information matches identification information, which is decided in advance for each count destination.

In a case where the image forming apparatus 100 is connected to a public line by using the communication unit 109 and the image information is transmitted to another image forming apparatus that has a FAX function (i.e., in a case of a FAX function), information (e.g., a company name or a FAX number) on a destination of FAX may be registered as identification information, which is decided in advance for each count destination, and a count destination may be specified in a case where a character string obtained by OCR processing of the image information matches a company name or a FAX number.

Also in a case where image information is received from another image forming apparatus having a FAX function, a count destination may be specified in a case where a character string obtained by OCR processing of the image information matches a company name or a FAX number.

Especially in the case of the FAX function, a time of communication or a communication partner may be stored in the count information database 510 in addition to or instead of information on the number of sheets of paper of a document.

In the embodiments above, the term "processor" refers to hardware in a broad sense. Examples of the processor includes general processors (e.g., CPU: Central Processing Unit), dedicated processors (e.g., GPU: Graphics Processing Unit, ASIC: Application Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. A count destination management apparatus comprising a processor configured to:
   receive image information entered by a user having a plurality of count destinations; and
   specify a count destination corresponding to the image information among the plurality of count destinations on a basis of identification information included in the image information, the identification information being registered in advance for each of the plurality of count destinations, the identification information including a character string corresponding to a project name.

2. The count destination management apparatus according to claim 1, wherein
   the image information includes a plurality of documents;
   the identification information includes at least format information on a document format, each of the plurality of count destinations being associated with corresponding format information; and
   in a case where the image information includes the format information, the processor distinguishes different documents per unit of use of the format information among the plurality of documents and specifies a count destination for each of the distinguished documents.

3. The count destination management apparatus according to claim 2, wherein
   the format information includes front-cover format information on a format of a front cover of a document, each of the plurality of count destinations being associated with corresponding front-cover format information; and
   the processor specifies a count destination for each of documents that are different in format of a front cover.

4. The count destination management apparatus according to claim 3, wherein
   the processor determines whether or not each page of the plurality of documents included in the image information includes the front-cover format information, divides the image information based on pages including the front-cover format information, and specifies a count destination for each of documents thus divided.

5. The count destination management apparatus according to claim 2, wherein
   the format information includes template information on a template of a document, the template information being associated with each of the plurality of count destinations; and
   the processor specifies a count destination for each of documents that are different in the template information.

6. The count destination management apparatus according to claim 3, wherein
   the format information includes template information on a template of a document, the template information being associated with each of the plurality of count destinations; and
   the processor specifies a count destination for each of documents that are different in the template information.

7. The count destination management apparatus according to claim 4, wherein
   the format information includes template information on a template of a document, the template information being associated with each of the plurality of count destinations; and
   the processor specifies a count destination for each of documents that are different in the template information.

8. The count destination management apparatus according to claim 5, wherein the processor determines whether or not each page of the plurality of documents included in the image information includes the template information, distinguishes documents for each page including the template information, and specifies a count destination for each of the distinguished documents.

9. The count destination management apparatus according to claim 6, wherein
the processor determines whether or not each page of the plurality of documents included in the image information includes the template information, distinguishes documents for each page including the template information, and specifies a count destination for each of the distinguished documents.

10. The count destination management apparatus according to claim 7, wherein
the processor determines whether or not each page of the plurality of documents included in the image information includes the template information, distinguishes documents for each page including the template information, and specifies a count destination for each of the distinguished documents.

11. The count destination management apparatus according to claim 2, wherein
the processor creates a log every time a count destination is specified and causes a correspondence between information on a document for which a count destination has been specified and the specified count destination to be recorded in the log.

12. The count destination management apparatus according to claim 3, wherein
the processor creates a log every time a count destination is specified and causes a correspondence between information on a document for which a count destination has been specified and the specified count destination to be recorded in the log.

13. The count destination management apparatus according to claim 4, wherein
the processor creates a log every time a count destination is specified and causes a correspondence between information on a document for which a count destination has been specified and the specified count destination to be recorded in the log.

14. The count destination management apparatus according to claim 5, wherein
the processor creates a log every time a count destination is specified and causes a correspondence between information on a document for which a count destination has been specified and the specified count destination to be recorded in the log.

15. The count destination management apparatus according to claim 6, wherein
the processor creates a log every time a count destination is specified and causes a correspondence between information on a document for which a count destination has been specified and the specified count destination to be recorded in the log.

16. The count destination management apparatus according to claim 7, wherein
the processor creates a log every time a count destination is specified and causes a correspondence between information on a document for which a count destination has been specified and the specified count destination to be recorded in the log.

17. The count destination management apparatus according to claim 8, wherein
the processor creates a log every time a count destination is specified and causes a correspondence between information on a document for which a count destination has been specified and the specified count destination to be recorded in the log.

18. The count destination management apparatus according to claim 11, wherein
the processor causes correspondences between pages of the plurality of documents included in the image information and count destinations specified for the pages to be recorded in the log.

19. The count destination management apparatus according to claim 1, wherein
the processor causes the specified count destination to be displayed for the user.

20. A non-transitory computer readable medium storing a program causing a computer to execute a process for count destination management, the process comprising:
receiving image information entered by a user having a plurality of count destinations; and
specifying a count destination corresponding to the image information among the plurality of count destinations on a basis of identification information included in the image information, the identification information being registered in advance for each of the plurality of count destinations, the identification information including a character string corresponding to a project name.

* * * * *